June 16, 1936.   W. DE V. HAIGH   2,044,684
PORTABLE MAINTENANCE ROLLER
Filed April 3, 1933

INVENTOR
W<sup>m</sup> De Vere Haigh
BY
ATTORNEY

Patented June 16, 1936

2,044,684

UNITED STATES PATENT OFFICE 2,044,684

PORTABLE MAINTENANCE ROLLER

William De Vere Haigh, Groveland, Calif., assignor to Carl H. Graham, San Antonio, Tex.

Application April 3, 1933, Serial No. 664,065

10 Claims. (Cl. 94—50)

This invention relates to highway maintenance equipment and particularly to road rollers. In connection with maintaining and repairing work on practically all classes of roads, except concrete, it is frequently necessary to use a roller on the repaired portions to place them in the necessary well packed condition and give them a smooth surface. At present the only equipment for this purpose are the relatively light and consequently inefficient hand rollers or the heavy power rollers which can travel but slowly and consume considerable time in moving from one point to another along the road.

It is therefore the principal object of my invention to provide a relatively heavy power roller especially designed for road maintenance work and arranged so that when not in use the roller itself is raised from the ground and its frame supported on ordinary wheels; said frame being adapted for connection as a trailer to a motor truck. In this manner the equipment truck of the maintenance work as well as the necessary roller can travel as a unit from one point of operation to another with a great saving of time and as fast as the truck itself can travel.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views.

Figure 1:
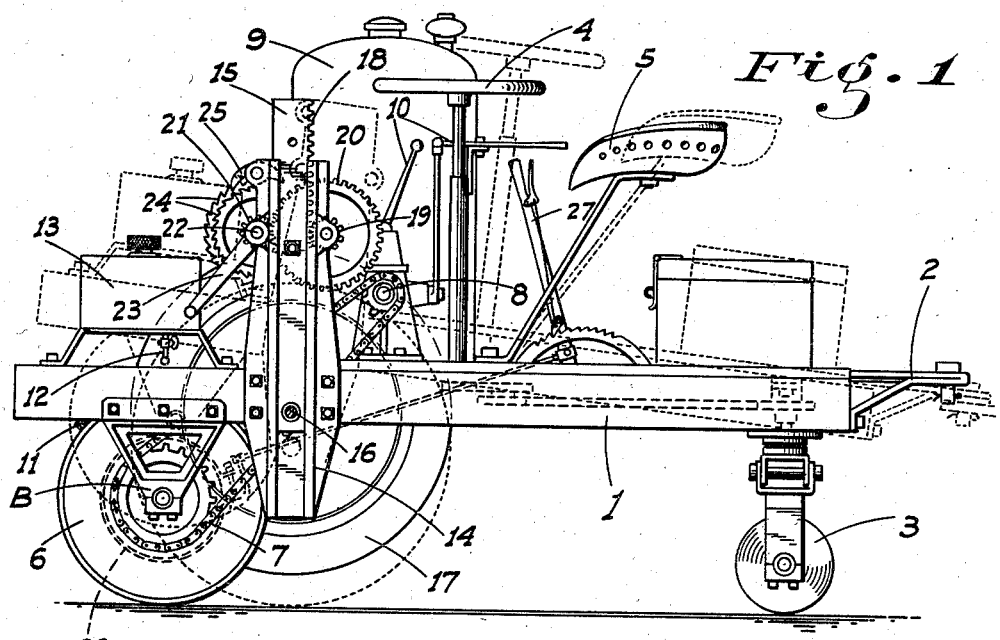
Fig. 1 is a side elevation of my improved roller as in operation, the near supporting wheel being removed and the inoperative or transporting position of the structure being shown in dotted lines.
Figure 2:
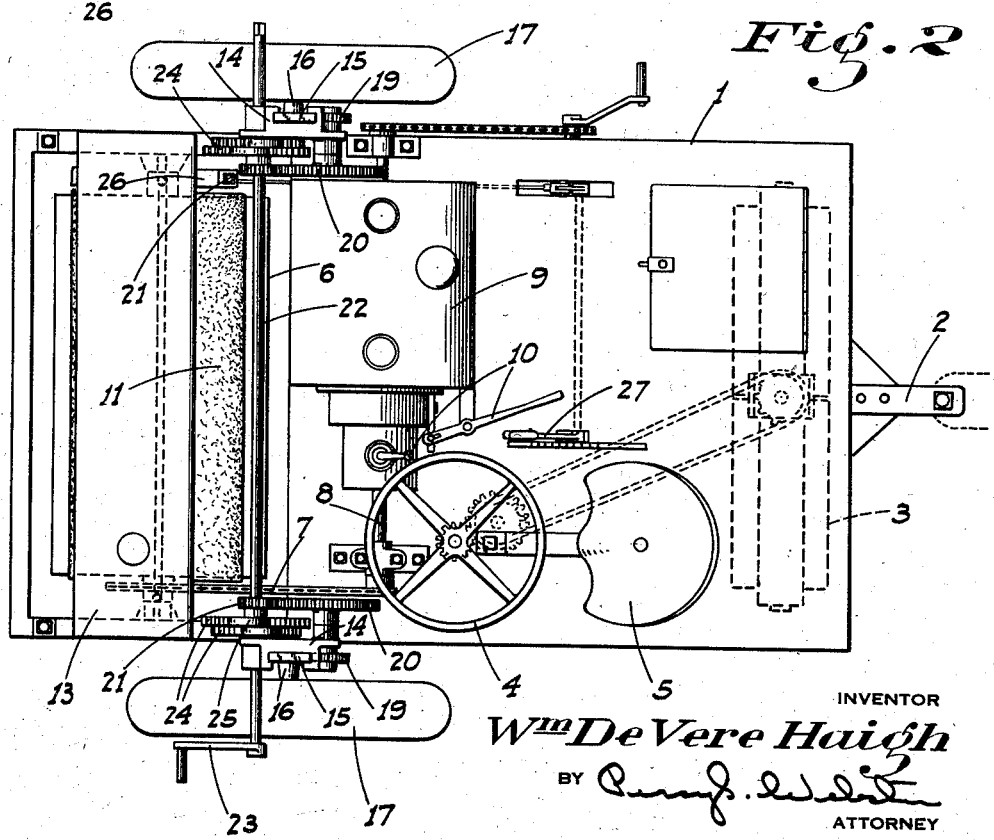
Fig. 2 is a top plan view of the roller.

Referring now more particularly to the characters of reference on the drawing, the numeral 1 denotes a horizontal rectangular frame having a heavy rigid clevice 2 at one end for connection to the draw bar of a hauling vehicle. An auxiliary roller unit 3 is mounted on and depends from the frame at its clevice end for swinging movement in a vertical transverse plane as well as in a horizontal plane. Said roller is controlled in its latter movement from a steering wheel 4 mounted on the frame 1 intermediate its ends and positioned convenient to the occupant of a seat 5 on the frame which faces the opposite end of the structure. This roller is arranged so that when the clevice is disengaged from the vehicle, it is supported on the ground.

Turnably supported from journal boxes B mounted on and depending from the frame 1 toward the end opposite the roller 3 is the main roller 6, connected at one end by a chain drive 7 or the like to the drive shaft 8 of a power plant such as a gas engine enclosed in a housing 9 mounted on the frame 1. This power plant is disposed in a longitudinal plane between the main roller and the seat and to one side of the latter. In this manner a very compact arrangement is had, the visibility of the operator is in no wise interfered with, and the various control levers 10 of the driving connections between the engine and roller are positioned convenient to the occupant of the seat. The roller is arranged so that when engaging the ground the frame 1 will be in a horizontal position, as shown in Fig. 1.

The upper surface of the roller is engaged by a felt or similar pad 11 kept in a moist condition when the roller is in use by kerosene or the like passing from a row of drip pipes 12 depending from a supply tank 13 mounted on the frame 1 above the roller.

Secured to the outside of the frame 1 adjacent the forward end of the main roller are rigid vertical guides 14 in which bars 15 are slidably mounted. At their lower ends these bars carry outwardly projecting spindles 16 on which pneumatic tired wheels 17 of ordinary character are turnably mounted. The bars on one side and toward their upper ends are provided with rack teeth 18 engaged by pinions 19 mounted on the corresponding guides. These pinions are connected to gears 20 preferably disposed behind the guides which mesh with other pinions 21. The latter pinions are mounted on a common shaft 22 journaled in and extending between the guides 14 to terminations outwardly of the wheels, being arranged on both ends for connection to crank handles 23. A pair of ratchet wheels 24 having their teeth facing in opposite directions are secured on the shaft 22 adjacent one end and are alternately engaged by a double pawl member 25 mounted on the adjacent guide. This structure may be duplicated on the shaft toward its opposite end if desired.

When the pawl is engaged with one wheel it prevents the shaft 22 from turning in such a direction as to cause the bars 15 and wheels to be lowered of their own weight. When the pawl is engaged with the other wheel it prevents the weight of the suspended frame and parts thereon from tending to raise the bars and wheels relative thereto. The wheels may thus be raised or lowered by hand, the gearing between the hand shaft and the rack bars providing sufficient leverage to enable this operation to be carried out without excessive physical effort. The shaft 22 is positioned at such a level that the wheels may be raised well clear of the ground when the roller is engaging same, without interfering with said shaft. The wheel spindles being individual to each supporting bar, the centers of the wheels may be raised above the level of the frame without interfering therewith and no restrictions on the size of the wheels or of the main roller are thus necessary. A hand brake structure 26 is preferably associated with the main roller and controlled by a lever 27 mounted in a position convenient to the seat 5 so that the speed of rolling operations may be properly controlled when operating on a down grade and without depending entirely on engine compression to hold the roller back.

In operation to use the roller the frame is disengaged from the hauling vehicle and the wheels are raised from the ground so that the roller can function as shown in Fig. 1. When it is desired to transport the device the wheels are again lowered to engage the ground and raise the roller clear of the same so that when the frame is attached to a vehicle it may travel at any speed without the roller turning or coming in contact even with high spots on the roadway.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A maintenance roller for highways comprising a frame adapted at one end for connection to a draft vehicle, a driven roller supported from the frame toward its opposite end, and wheels mounted in connection with the frame toward said opposite end for selective engagement with or disengagement from the ground.

2. A maintenance roller for highways comprising a frame adapted at one end for connection to a draft vehicle, a driven roller supported from the frame toward its opposite end, wheels to the sides of and longitudinally spaced from the roller and means mounting the wheels in direct connection with the frame for selective vertical adjustment to place said wheels into engagement with the ground and maintain the roller clear of the ground, or to enable said roller to engage the ground while the wheels are held clear of the same.

3. A device as in claim 1, with a steerable auxiliary roller mounted in connection with and under the frame adjacent said one end to engage the ground when the frame is disengaged from the vehicle.

4. A maintenance roller for highways comprising a frame adapted at one end for connection to a draft vehicle, a roller supported from the frame toward its opposite end, wheels to the sides of the roller, vertical bars having spindles on which the wheels are turnably mounted, guides mounted on the frame and slidably engaging the bars, teeth down one side of the bars, pinions mounted on the guides and engaging said teeth, a hand control shaft journalled in and extending between the guides above the highest position of the wheels relative to the frame to terminations outwardly of the wheels for actuation from either end, and separate gearing connections between said shaft and the pinions.

5. A maintenance roller for highways and the like comprising a frame, a driven roller supported from the frame, wheels mounted in connection with the frame adjacent said roller for selective engagement with or disengagement from the ground.

6. A maintenance roller for highways and the like comprising a frame, a driven roller supported from the frame, wheels mounted in connection with the frame adjacent said roller for selective engagement with or disengagement from the ground, and connections carried by said frame through which the device may be propelled when supported on said wheels.

7. A maintenance roller for highways and the like comprising a frame adapted at one end for connection to a draft vehicle, a roller supported from the frame toward its opposite end, wheels mounted in connection with the frame toward said opposite end for selective engagement with or disengagement from the ground, and latching means for positively latching said wheels in their lowermost position with respect to said frame and roller.

8. A maintenance roller for highways and the like comprising a frame adapted at one end for connection to a draft vehicle, a roller supported from the frame toward its opposite end, wheels to the sides of and longitudinally spaced from the roller, means mounting the wheels in direct connection with the frame for selective vertical adjustment to place said wheels into engagement with the ground and maintain the roller clear of the ground, or to enable said roller to engage the ground while the wheels are held clear of the same, and positive latching means for positively latching said mounting means with the wheels in their lower position, thus positively supporting the roller clear of the ground.

9. A maintenance roller for highways and the like comprising a frame adapted at one end for connection to a draft vehicle, a roller supported from the frame toward its opposite end, wheels adapted to be positioned to the sides of the roller, bars having spindles on which the wheels are turnably mounted, slotted members on said frame for movably engaging said bars, and latching means for releasably and positively holding said bars in their lowermost position within the slots of said members.

10. A maintenance roller for highways and the like comprising a frame adapted at one end for connection to a draft vehicle, a roller supported from the frame toward its opposite end, wheels to the sides of the roller, vertical bars having spindles adjacent their lower ends on which the wheels are turnably mounted, guides mounted on the frame and slidably engaging the bars, means for moving the bars up and down selectively, and latching means for releasably and positively holding said bars in their lowermost position within said guides.

WILLIAM DE VERE HAIGH.